US006073056A

United States Patent [19]
Gawronski et al.

[11] Patent Number: 6,073,056
[45] Date of Patent: Jun. 6, 2000

[54] METHOD AND SYSTEM FOR BUILDING A DATA MODEL OF A PHYSICAL PART IN A DATA FORMAT USEFUL FOR AND REPRODUCTION OF THE PART

[75] Inventors: David E. Gawronski, Macomb; Charles R. Hunter, Sterling Heights, both of Mich.

[73] Assignee: Larry J. Winget, Leonard, Mich.

[21] Appl. No.: 08/827,721

[22] Filed: Apr. 8, 1997

[51] Int. Cl.[7] .................................................... G06F 19/00
[52] U.S. Cl. .............................................. 700/98; 700/195
[58] Field of Search .................................. 700/161, 195, 700/98; 318/570

[56] References Cited

U.S. PATENT DOCUMENTS

| | | | |
|---|---|---|---|
| 4,525,858 | 7/1985 | Cline et al. | 382/154 |
| 5,121,329 | 6/1992 | Crump | 700/119 |
| 5,319,567 | 6/1994 | Ebenstein | 700/192 |
| 5,340,433 | 8/1994 | Crump | 156/578 |
| 5,384,717 | 1/1995 | Ebenstein | 700/98 |
| 5,402,582 | 4/1995 | Raab | 33/503 |
| 5,412,880 | 5/1995 | Raab | 33/503 |
| 5,414,647 | 5/1995 | Ebenstein et al. | 702/167 |
| 5,426,722 | 6/1995 | Batchelder | 700/245 |
| 5,428,548 | 6/1995 | Pilborough et al. | 700/195 |
| 5,440,496 | 8/1995 | Andersson et al. | 700/163 |
| 5,442,572 | 8/1995 | Kiridena et al. | 382/141 |
| 5,452,219 | 9/1995 | Dehoff et al. | 700/163 |
| 5,490,080 | 2/1996 | Jarrige et al. | 700/98 |
| 5,491,643 | 2/1996 | Batchelder | 395/500.01 |
| 5,503,785 | 4/1996 | Crump et al. | 264/40.7 |
| 5,510,977 | 4/1996 | Raab | 700/66 |
| 5,528,505 | 6/1996 | Granger et al. | 700/195 |
| 5,546,328 | 8/1996 | Kiridena et al. | 700/279 |
| 5,552,992 | 9/1996 | Hunter | 700/118 |
| 5,587,912 | 12/1996 | Andersson et al. | 700/98 |
| 5,627,771 | 5/1997 | Makino | 702/155 |
| 5,630,981 | 5/1997 | Hull | 264/401 |
| 5,652,709 | 7/1997 | Andersson et al. | 700/97 |
| 5,691,905 | 11/1997 | Dehoff et al. | 700/98 |
| 5,724,264 | 3/1998 | Rosenberg et al. | 702/152 |
| 5,729,463 | 3/1998 | Koenig et al. | 700/98 |

Primary Examiner—William Grant
Assistant Examiner—Zoila Cabrera
Attorney, Agent, or Firm—Brooks & Kushman P.C.

[57] ABSTRACT

Method and system are provided for building a data model of a physical part in a data format useful for reproduction of the part. The system preferably includes a Moiré interferometry system including a camera mounted on a portable coordinate measuring system (CMM) to obtain high density data scans in the form of 3-D point data from different positions and orientations of the interferometry system relative to the part. The CMM provides position data to enable an engineering workstation to convert the data scans obtained in multiple local coordinate systems into a single global coordinate system. The engineering workstation then integrates the data scans in the global coordinate system and joins the point data to form a polygonal structure corresponding to multiple continuous surfaces of the physical part. From this data, a tool path can be generated to cut a reproduction of the part or a mold for molding the reproduction. Alternatively, a stereo-lithography or FDM file can be generated for use in a fused deposition molding (FDM) system to form a mold layer-by-layer. Such a mold can then be adapted for use in a system to vacuum cast the reproduction.

38 Claims, 2 Drawing Sheets

METHOD AND SYSTEM FOR BUILDING A DATA MODEL OF A PHYSICAL PART IN A DATA FORMAT USEFUL FOR AND REPRODUCTION OF THE PART

TECHNICAL FIELD

This invention relates to methods and systems for building data models of a physical part and, in particular, to methods and systems for building data models of a physical part in a data format useful for and reproduction of the part.

BACKGROUND ART

Various methods and systems are available for collecting three-dimensional data for digitization of a three-dimensional object. This data can be obtained from non-contact devices such as laser scanners or camera-based Moiré interferometry systems.

Laser scanning is a light mensuration technique which has been used to collect data from the surface of a three-dimensional article. The data points correspond to coordinate values over the surface of the scanned article, for example taken along the X, Y and Z axes. The laser scan head traverses a scan path over the surface of the article and at selectable distances along the path, point values may be taken. The laser scan generally results in generation of a set of scan data in a digitized format. The Hunter U.S. Pat. No. 5,552,992 and the Dehoff et al. U.S. Pat. No. 5,452,219 disclose such a technique.

The Cline et al. U.S. Pat. No. 4,525,858 discloses a method and apparatus for reconstruction of three-dimensional surfaces from interference fringes wherein the three-dimensional surface is used as input to a CAD/CAM system.

The Ebenstein et al. U.S. Pat. No. 5,414,647, Kiridena et al. U.S. Pat. No. 5,546,328, Ebenstein U.S. Pat. No. 5,384,717, Kiridena et al. U.S. Pat. No. 5,442,572, and Ebenstein U.S. Pat. No. 5,319,567 all disclose the use of a laser scanner to collect three-dimensional point data of a part surface to thereby obtain a high density point data model. The high density point data model does not approximate part geometry like a traditional CAD model does where a relatively few number of points are used to represent a part by using these points as control points in constructing spline curves or other mathematical curves to represent part geometry. If one requires a better geometric definition of the high density point data model, one only need take the data at a higher density or use a more accurate measuring device to get more accurate data.

With particular reference to the Ebenstein et al. U.S. Pat. No. 5,414,647, the patent acknowledges the problem of integrating high density data scans which have been collected from different orientations. The patent describes the use of the location of reference features in local coordinate systems to obtain a transform and mapping scan data from the local coordinate systems into a global coordinate system based on the transform to obtain a CAD model of the object in the global coordinate system. However, oftentimes it is difficult, if not impossible, to determine or provide for reference features in the local coordinate systems.

The Raab U.S. Pat. Nos. 5,402,582, 5,412,880, and 5,510,977 disclose a portable coordinate measuring machine comprising a multi-jointed manually positionable measuring arm for measuring a volume including a controller which acts as an electronic interface between the arm and a host computer.

The Batchelder U.S. Pat. Nos. 5,491,643 and 5,426,722 and the Crump U.S. Pat. Nos. 5,340,433 and 5,121,329, and the Crump et al. U.S. Pat. No. 5,503,785 all disclose a rapid prototyping system in the form of a fused deposition modeling system which builds a model layer-upon-layer using an extrusion and laminating procedure from a CAD model of a part.

SUMMARY OF THE INVENTION

An object of the present invention is to provide a method and system for building a data model of a physical part in a data format useful for and reproduction of the part without requiring any specialized hardware for precise part orientation.

Another object of the present invention is to provide a method and system for building a data model of a physical part in a data format useful for and reproduction of the part wherein scan data may be taken from any number of positions and orientations and is independent of any particular scan method or device.

A still further object of the present invention is to provide a method and system for building a data model of a physical part in a data format useful for and reproduction of the part wherein scan data is taken in different local coordinate systems and transformed into a global coordinate system based on precise measurements of the position and orientation of a light measuring device relative to the physical part.

In carrying out the above objects and other objects of the present invention, a method is provided for building a data model of a physical part in a data format useful for and reproduction of the part. The method includes the step of scanning a first surface of the physical part with a light measuring device at a first position and orientation of the device relative to the physical part to obtain a first set of 3-D point data which represents the geometry of the first surface in a first local coordinate system. The method also includes the steps of measuring the first position and orientation of the device relative to the physical part to obtain a first set of position data and generating a first transform based on the first set of position data.

The method also includes the steps of mapping the first set of 3-D point data in a global coordinate system based on the first transform and scanning a second surface of the physical part with the light measuring device at a second position and orientation different from the first position and orientation of the device relative to the physical part to obtain a second set of 3-D point data which represents the geometry of the second surface in a second local coordinate system. The method also includes the steps of measuring the second position and orientation of the device relative to the physical part to obtain a second set of position data, generating a second transform based on the second set of position data, and mapping the second set of 3-D point data in the global coordinate system based on the second transform. Finally, the method includes the step of integrating the first and second sets of 3-D point data in the global coordinate system to obtain the data model of the physical part in the data format.

Further in carrying out the above objects and other objects of the present invention, a system is provided for building a data model of a physical part and a data format useful for and reproduction of the part. The system includes a light measuring device for scanning first and second surfaces of the physical part at first and second positions and orientations of the light measuring device relative to the physical part, respectively, to obtain first and second sets of 3-D point data which represent the geometry of the first and second surfaces in first and second local coordinate systems, respectively. The system also includes a measuring apparatus for measuring the first and second positions and orientations of the light measuring device relative to the physical part to obtain first and second sets of position data, respectively. The system further includes a computer programmed to generate a first transform based on the first set of position data, generate a second transform based on the second set of position data, map the first set of 3-D point data in a global coordinate system based on the first transform, map the second set of 3-D point data in the global coordinate system based on the second transform, and integrate the first and second sets of 3-D point data in the global coordinate system to obtain the data model of the physical part in the data format.

Preferably, the light measuring device is a Moiré interferometry system including a camera which forms an array of pixels, each of the pixels having a gray scale level.

Also, preferably, the first and second sets of 3-D point data overlap in the global coordinate system and wherein integration of the sets of data includes filtering the 3-D point data which overlaps in the global coordinate system.

Still, preferably, the first and second sets of 3-D point data are joined in the global coordinate system to form a polygonal structure corresponding to the first and second surfaces of the physical part.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
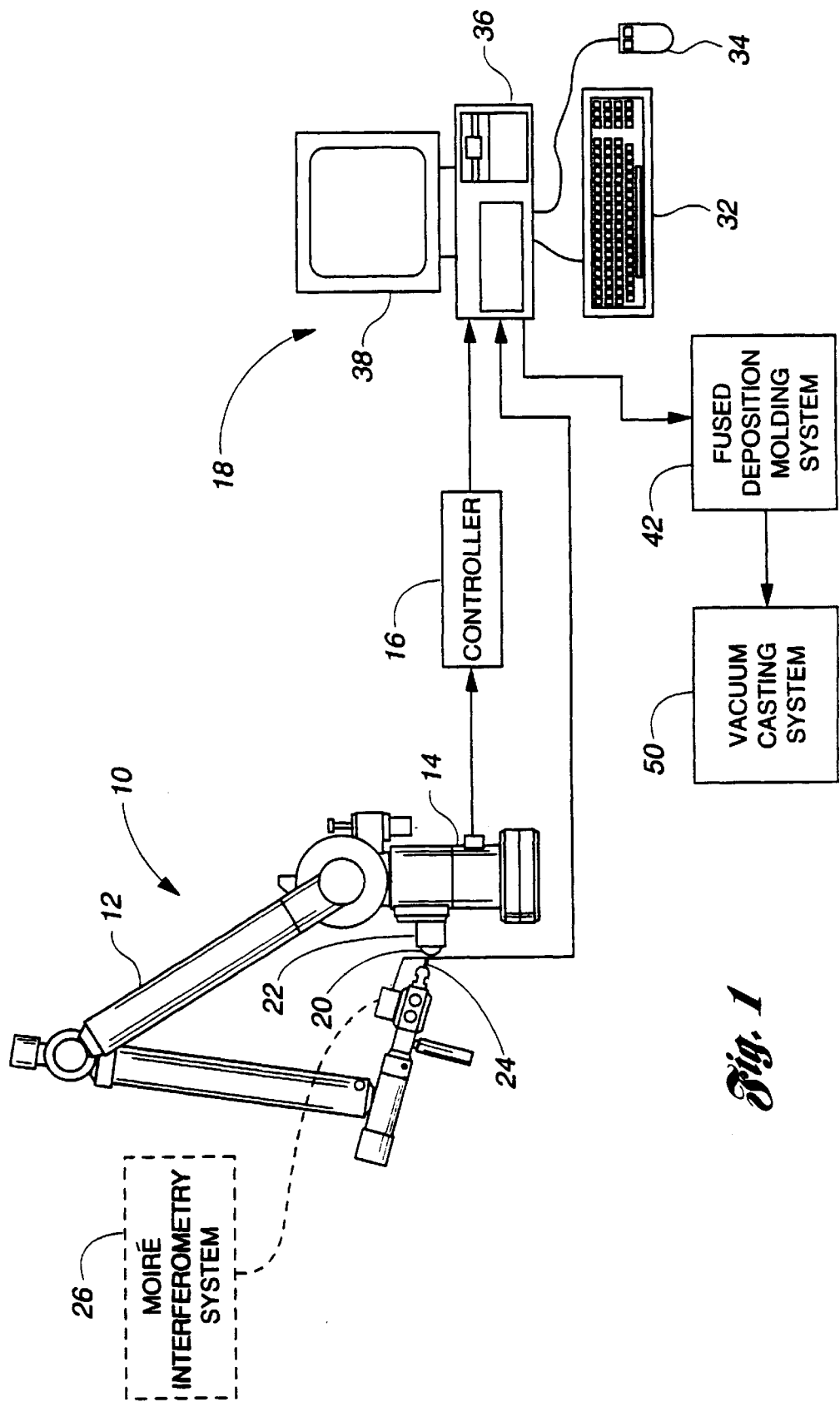
FIG. 1 is a schematic view of a system of the present invention for building a data model in a data format useful for and reproduction of the part.

Referring now to the drawing Figures, there is illustrated in FIG. 1 a portable coordinate measuring machine (i.e. CMM), generally indicated at 10, including a manually operated multi-jointed arm 12 and a support base or post 14. The coordinate measuring machine 10 also includes a controller 16 which communicates with a host computer or engineering workstation, generally indicated at 18. The machine 10 and its controller 16 are more particularly described in the above-noted patents to Raab. However, in general, the coordinate measuring machine 10 includes transducers which gather rotational positioning data and forward this data to the controller 16 which is provided to reduce the overall requirements of the engineering workstation 18 to handle calculations and to thereby provide preliminary data manipulation. The controller 16 processes the transducer data on an ongoing basis and provides three-dimensional positional and/or orientation information to the engineering workstation 18.

As further illustrated in FIG. 1, the coordinate measuring machine 10 illustrates a probe tip calibration system including a reference ball 20 in a mount 22 attached to the base 14 wherein the ball represents the absolute origin of the device corresponding to X, Y and Z axes. Because of the known position of the reference ball 20, positioning of a tip 24 allows the machine 10 to determine the coordinates of the tip 24 in relationship to the last link of the arm 12. Knowledge of the coordinates of the tip 24 allows the coordinate measuring machine 10 to determine the position and orientation of its last link.

However, it is to be understood that 3-D positional and/or orientation information may be provided to the engineering workstation 18 by other methods and apparatus without departing from the method and system of the present invention.

Figure 2:
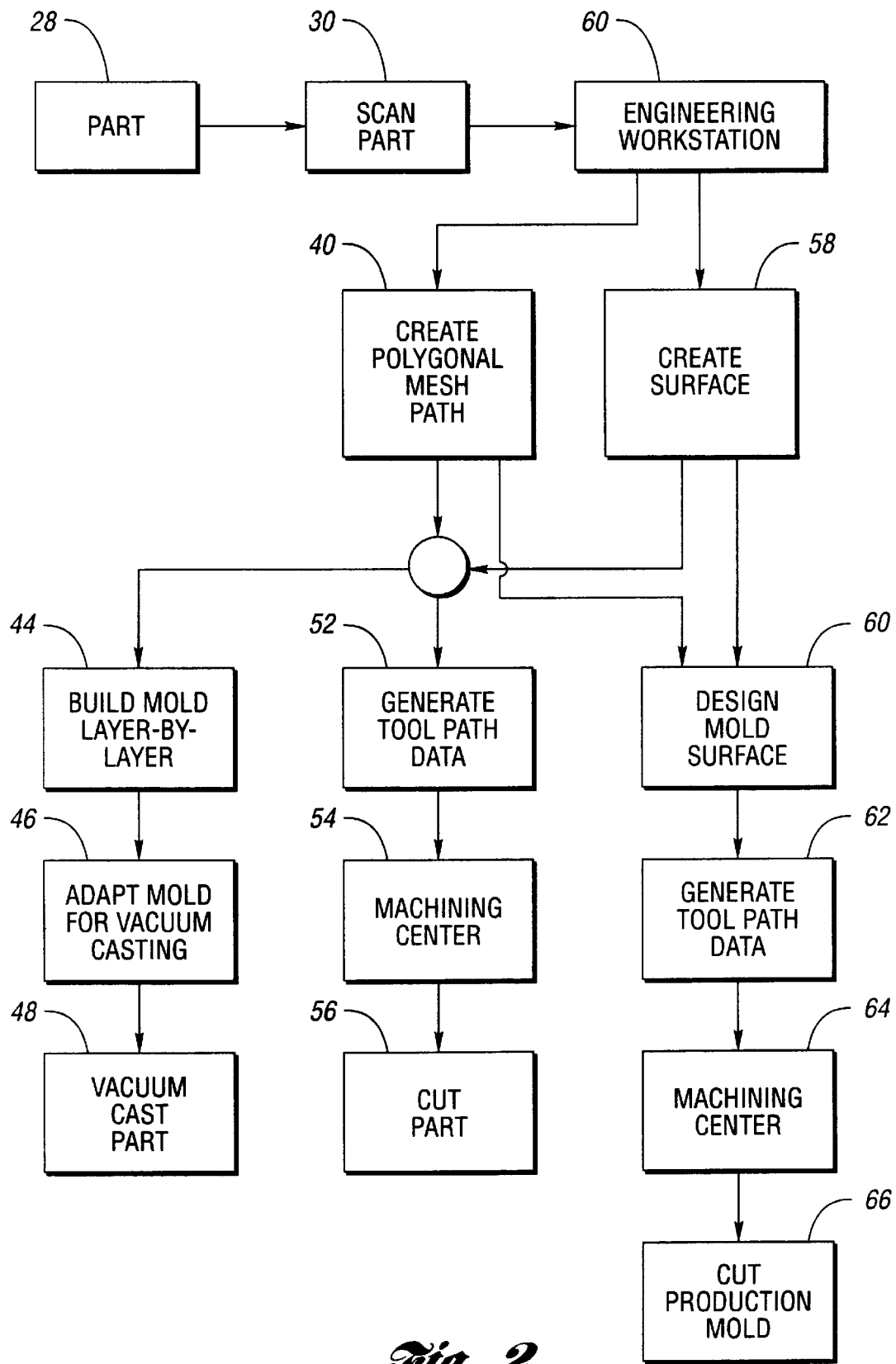
FIG. 2 is a block diagram flow chart illustrating the method and system of the present invention.

Mounted on the last link of the coordinate measuring machine 10 is a light measuring device such as a Moiré interferometry system 26, which preferably includes a camera or sensor for receiving projected light projected onto and reflected from a part 28, as illustrated in FIG. 2. The step of scanning the part with the interferometry system 26 is illustrated at block 30 in FIG. 2. A Moiré interferometry system generally of the type used in the present invention is disclosed in the Steinbickler U.S. Pat. No. 5,289,264 and Cline et al. U.S. Pat. No. 4,525,858.

However, it is to be understood that high density data scans can also be obtained from a laser scanner or other methods of obtaining high density data other than the interferometry system 26 as disclosed in FIG. 1.

In general, the interferometry system 26 scans the part 28 at a first position and orientation of the system 26 defined by the CMM 10 relative to the part 28 to obtain a first set of 3-D point data which represents the geometry of a first surface in a first local coordinate system. This data is mapped into a global coordinate system based on a transformation matrix generated at the engineering workstation 18 from a first set of digitized position data provided by the coordinate measuring machine 10 and its controller 16. Then, second and additional sets of 3-D point data in their respective local coordinate systems are similarly obtained for additional surfaces of the part 28. These additional sets of data are mapped into the global coordinate system again within the workstation 18 by transformation matrixes formed from their respective sets of digitized position data provided by the CMM 10 and its controller 16.

Typically, the sets of 3-D point data in the global coordinate system overlap each other and, consequently, an operator of the workstation 18 edits the 3-D point data in the global coordinate system by means of a keyboard 32 and/or a mouse 34, both connected in a typical fashion to a chassis 36 of the workstation 18. The workstation 18 is preferably programmed to have a graphical user interface for display on a display screen 38 of the workstation 18.

The point data in the global coordinate system may then processed within the workstation 18 to yield a polygonal-faceted, three-dimensional surface representation or structure which can be displayed and manipulated at the workstation 18 using computer-aided design techniques. Preferably, the polygonal surface representation is formed by triangulation wherein the point data are joined to form a triangular or wire frame representation of the three-dimensional surface corresponding to the surface of the object. This data is also called polygonal mesh data, as indicated at block 40 in FIG. 2.

The polygonal mesh data may then be converted into a stereolithography or FDM file within the workstation 18 for use in a fused deposition molding (i.e., FDM) system, as indicated at 42 in FIG. 1. Such a fused deposition molding system may be utilized to build a mold layer-by-layer, as indicated at block 44 in FIG. 2. The fused deposition molding system 42 may comprise a system such as the FDM 1600 system manufactured by Stratasys, Inc. of Eden Prairie, Minn. Such molding systems build models layer-by-layer using an extrusion and laminating procedure. Such a system may use ABS as a molding material.

As indicated at block 46 in FIG. 2, the resulting mold formed at block 44 may be adapted for vacuum casting such as by drilling one or more holes through the mold.

As indicated at block 48 in FIG. 2, the part 28 may be then reproduced by vacuum casting a reproduction of the part 28, such as in a vacuum casting system 50 of FIG. 1. A vacuum casting system 50 useful in the method and system of the present invention is available from Mining & Chemical Products, Ltd. of England.

Together with the mold formed in the molding system 42, the vacuum casting system 50 makes a prototype plastic part at block 48 of FIG. 2. The vacuum formed part may then be scanned, modified and then rescanned as is necessary.

Instead of building a mold layer-by-layer, as indicated by block 44, the polygonal mesh data created at block 40 may be further processed at the workstation 18 to generate NC tool path data, as indicated at block 52, for a particular machining center 54. At the machining center 54, a reproduction of the part 28 can be cut from the NC tool path data, as indicated at block 56.

Instead of creating a polygonal mesh data as indicated at block 40, the sets of 3-D point data in the global coordinate system may be utilized to create a part surface which can be manipulated within the workstation 18 and passed to a CAD system, as indicated at block 58. Once the part surface is created, as indicated at block 58, blocks 52, 54 and 56 or blocks 44, 46 and 48 can then be entered. Alternatively, as is also the case with the polygonal mesh data generated at block 40, the surface created at block 58 can then be passed to a block 60 wherein a mold surface may be designed at the workstation 18 or a different workstation which is merely an inverted or negative version of the part surface.

Thereafter, at block 62, NC tool path data is generated at the workstation 18 or a different workstation for a particular machining center 64 to cut a production mold, as indicated at block 66.

While the best mode for carrying out the invention has been described in detail, those familiar with the art to which this invention relates will recognize various alternative designs and embodiments for practicing the invention as defined by the following claims.

What is claimed is:

1. A method for building a data model of a physical part in a data format useful for reproduction of the part, the method comprising the steps of:

scanning a first surface of the physical part with a light measuring device at a first position and orientation of the device relative to the physical part to obtain a first set of 3-D point data which represents geometry of the first surface in a first local coordinate system;

measuring the first position and orientation of the device relative to the physical part to obtain a first set of position data;

generating a first transform based on the first set of position data;

mapping the first set of 3-D point data in a global coordinate system based on the first transform;

scanning a second surface of the physical part with the light measuring device at a second position and orientation different from the first position and orientation of the device relative to the physical part to obtain a second set of 3-D point data which represents geometry of the second surface in a second local coordinate system;

measuring the second position and orientation of the device relative to the physical part to obtain a second set of position data;

generating a second transform based on the second set of position data;

mapping the second set of 3-D point data in the global coordinate system based on the second transform; and integrating the first and second sets of 3-D point data in the global coordinate system to obtain the data model of the physical part in the data format.

2. The method of claim 1 wherein the measuring device includes a camera to form an array of pixels, each of the pixels having a gray scale level.

3. The method of claim 1 wherein the light measuring device is a Moiré interferometry system.

4. The method of claim 1 wherein the first and second sets of 3-D point data overlap in the global coordinate system and wherein the step of integrating includes the step of filtering the 3-D point data which overlaps in the global coordinate system.

5. The method of claim 1 further comprising the step of joining the first and second sets of 3-D point data in the global coordinate system to form a polygonal structure corresponding to the first and second surfaces of the physical part.

6. The method of claim 5 wherein the polygonal structure is a triangular polygonal structure.

7. The method of claim 5 further comprising the step of creating a reproduction of the part based on the polygonal structure.

8. The method of claim 1 wherein each of the first and second transforms is a transformation matrix.

9. The method of claim 7 wherein the step of creating the reproduction of the part includes the step of creating a mold based on the polygonal structure.

10. The method of claim 9 wherein the step of creating the reproduction of the part includes the step of vacuum casting the reproduction of the part utilizing the mold.

11. The method of claim 9 wherein the step of creating the mold includes the step of forming the mold layer-by-layer.

12. The method of claim 1 wherein at least one of the steps of measuring includes the step of providing a passive coordinate measuring machine including an arm having a plurality of degrees of freedom and a contact probe connected at a distal end of the arm.

13. The method of claim 12 wherein at least one of the steps of scanning is performed with a camera mounted on the arm.

14. The method of claim 1 further comprising the step of processing the data model to generate a tangible reproduction of the physical part in two or more dimensions.

15. The method of claim 14 wherein the processing step includes the step of generating a two-dimensional graphic reproduction of the physical part.

16. The method of claim 14 wherein the processing step includes the step of generating a three-dimensional reproduction of the physical part.

17. The method of claim 14 wherein the processing step includes the step of generating a three-dimensional negative reproduction of the physical part.

18. The method of claim 1 further comprising the step of processing the data model to generate a tool path for machining a reproduction of the physical part.

19. The method of claim 18 wherein the processing step includes the step of generating a tool path for machining a reproduction of the physical part in negative form.

20. A system for building a data model of a physical part in a data format useful for reproduction of the part, the system comprising:

a light measuring device for scanning first and second surfaces of a physical part at first and second positions and orientations of the light measuring device relative to the physical part, respectively, to obtain first and second sets of 3-D point data which represent geometry of the first and second surfaces in first and second local coordinate systems, respectively;

a measuring apparatus for measuring the first and second positions and orientations of the light measuring device relative to the physical part to obtain first and second sets of position data, respectively; and a computer programmed to:
generate first and second transforms based on the first and second sets of position data, respectively;
map the first and second sets of 3-D point data in a global coordinate system based on the first and second transforms, respectively; and
integrate the first and second sets of 3-D point data in the global coordinate system to obtain the data model of the physical part in the data format.

21. The system of claim 20 wherein the light measuring device includes a camera to form an array of pixels, each of the pixels having a gray scale level.

22. The system of claim 20 wherein the light measuring device is a Moiré interferometry system.

23. The system of claim 20 wherein the first and second sets of 3-D point data overlap in the global coordinate system and wherein the computer is programmed to filter the 3-D point data which overlaps in the global coordinate system.

24. The system of claim 20 wherein the computer is programmed to join the first and second sets of 3-D point data in the global coordinate system to form a polygonal structure corresponding to the first and second surfaces of the physical part.

25. The system of claim 24 wherein the polygonal structure is a triangular polygonal structure.

26. The system of claim 24 further comprising means for creating a reproduction of the part based on the polygonal structure.

27. The system of claim 20 wherein each of the first and second transforms is a transformation matrix.

28. The system of claim 26 wherein the means for creating the reproduction of the part includes means for creating a mold based on the polygonal structure.

29. The system of claim 28 wherein the means for creating the reproduction of the part includes means for vacuum casting the part utilizing the mold.

30. The system of claim 28 wherein the means for creating the mold includes a fused deposition molding system.

31. The system of claim 20 wherein the measuring apparatus includes a passive coordinate measuring machine with an arm having a plurality of degrees of freedom and a contact probe connected at a distal end of the arm.

32. The system of claim 31 wherein the light measuring device includes a camera mounted on the arm.

33. The system of claim 20 further comprising means for processing the data model to generate a tangible reproduction of the physical part in two or more dimensions.

34. The system of claim 33 wherein the means for processing includes means for generating a two-dimensional graphic reproduction of the article.

35. The system of claim 33 wherein the means for processing includes means for generating a three-dimensional reproduction of the physical part.

36. The system of claim 33 wherein the means for processing includes means for generating a three-dimensional negative reproduction of the physical part.

37. The system of claim 20 wherein the computer is programmed to generate a tool path for machining a reproduction of the physical part.

38. The system of claim 37 wherein the computer is programmed to generate a tool path for machining a reproduction of the physical part in negative form.

* * * * *